Jan. 25, 1938.   P. F. SCHMITT   2,106,538
EXTENSION SHELF
Filed May 24, 1937
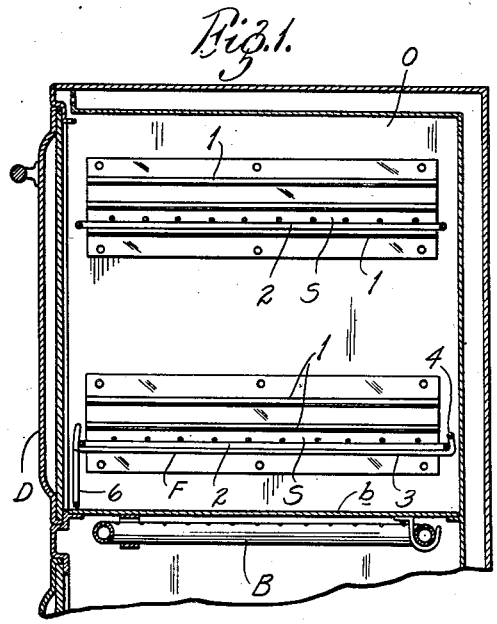
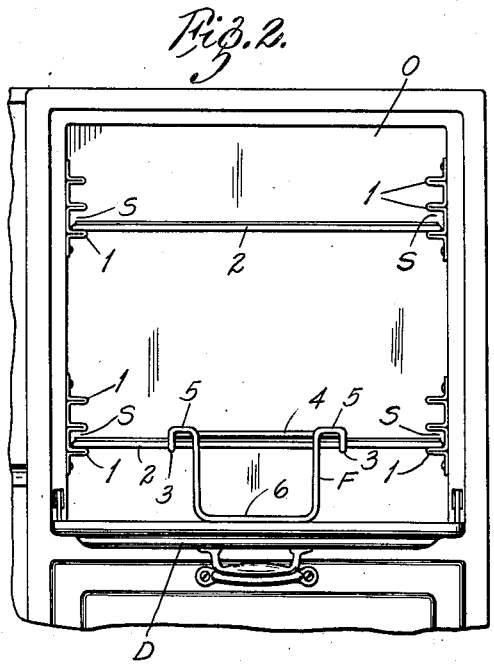
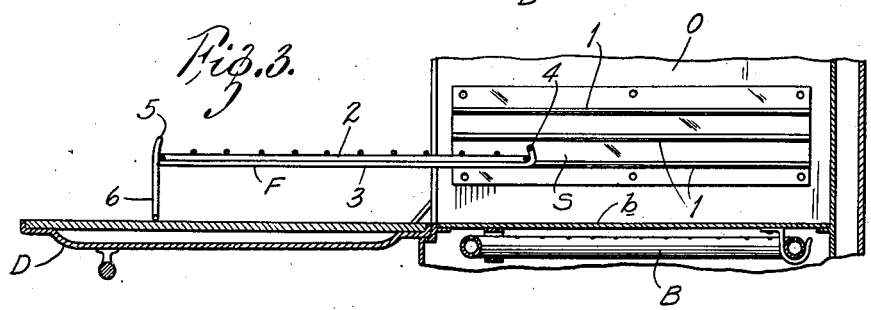
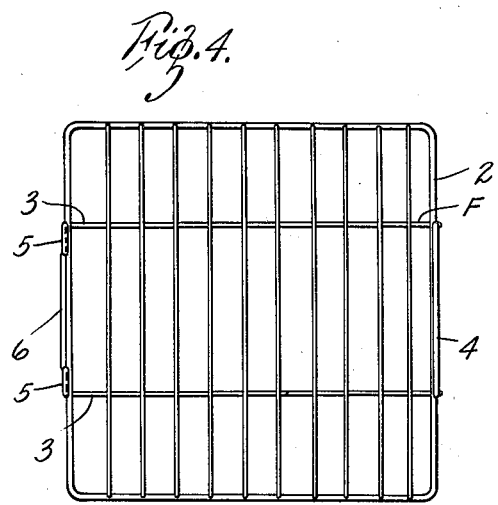
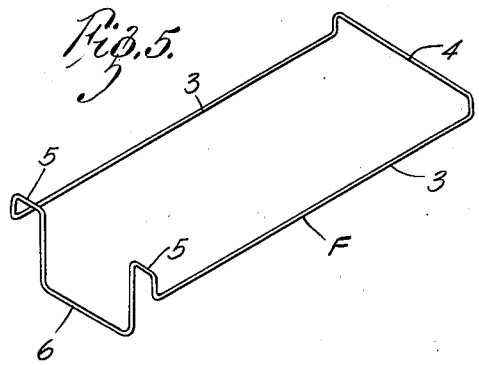
INVENTOR:
PAULA F. SCHMITT,
BY Harry A. Dennes
ATTORNEY.

Patented Jan. 25, 1938

2,106,538

UNITED STATES PATENT OFFICE 2,106,538

EXTENSION SHELF

Paula F. Schmitt, St. Louis, Mo., assignor to Anna Fowler, St. Louis, Mo.

Application May 24, 1937, Serial No. 144,360

2 Claims. (Cl. 211—153)

My invention has relation to improvements in supporting devices for oven grills or shelves and it consists in the novel features of construction more fully set forth in the specification and pointed out in the claims.

The principal object of the invention is to provide a detachable supporting device that may be applied to the grill of an oven whereby the grill may be moved out of the oven and supported on the door thereof.

A further object of the invention is to provide a grill supporting device that is simple in construction, certain in operation, and one that may be manufactured at comparatively low cost.

These advantages, as well as others inherent in the invention, will be better apparent from a detailed description thereof in connection with the accompanying drawing, in which:

Figure 1 represents a middle vertical longitudinal section through a conventional gas oven in which there is a supporting grill of typical construction to which my improved supporting device is applied; Fig. 2 is a front elevation of the oven with the door in open position and parts broken away; Fig. 3 is a section similar to that shown in Fig. 1 except that the door of the oven is shown in open position and the grill, together with the supporting device therefor, moved forwardly out of the oven.

Figure 4 is a plan view of a typical oven grill with my improved supporting device applied thereto; and Fig. 5 is a perspective view of the supporting device detached from the grill.

Referring to the drawing, O represents a gas oven adapted to be heated by flames from the burner B and having its side walls equipped with grill supporting members 1, 1 properly spaced to receive a wire grill 2 slidingly confined in the space S between said members 1, 1. The front of the oven O is provided with the usual door D arranged to drop downwardly to form a continuation of the bottom b of the oven when the door is open. The arrangement of the parts thus far described form the typical construction of a domestic gas oven and are in no wise modified for the application of my invention presently to be described.

It is a matter of common knowledge among cooks and housewives that when the grill 2 is used to support meats or pastries that have to be occasionally examined in the cooking or baking operation, the front end of the grill must be held while such inspection takes place if it is pulled more than half way out of the oven. This makes it difficult for the housewife to perform any necessary operations on the food undergoing preparation as she has but one hand free.

Therefore, it is common practice among housewives to remove the grill 2 entirely from the oven and rest the same on the door D. With the use of my improved supporting device, the grill 2 may be supported no matter how far it may be pulled out of the oven provided its inner end remains in the space S.

The supporting device comprises a wire frame F of general rectangular shape, the sides 3, 3 of which are connected at one end by a cross member 4 extending upwardly beyond the plane of the side members 3, 3. At the end opposite to the cross member 4, there are short portions 5, 5 extending upwardly, between which members 5, 5 there is a downwardly extending portion 6 which forms a foot for supporting this end of the frame.

In applying the supporting member to the grill 2, the latter is placed on the side members 3, 3 and confined between the end member 4 and end members 5, 5. It will be observed that the frame F is not as wide as the grill 2 so that it will not interfere with the disposition of the grill in the spaces S within the oven O. Having assembled the grill 2 and the frame F, as just explained, the grill is slid into the spaces S of the oven in the customary manner with the foot 6 of the frame F to the front so that the foot will be at the front of the oven when the oven is closed. When the grill 2 and frame F are within the oven, the grill 2 functions as it would without the frame F; but upon sliding the grill 2 forwardly out of the oven, the foot 6 of the frame F will rest on the door D (as shown in Fig. 3).

Thus, the grill 2, together with the weight of the food-stuffs thereon, is supported at its forward end when it is withdrawn from the oven, and there is no occasion for the housewife to hold it and run the risk of being burned.

In moving the grill 2, together with its supporting device, in and out of the oven O, the end member 4 and end members 5, 5 insure that the grill and supporting device move as a unit so that there is no danger of disarranging the grill and support while in use. The end member 4 and end members 5, 5 project upwardly beyond the grill 2 so as to engage a broiler, roasting pan or other container in which food-stuff is being baked so that the grill, together with such container, may be moved in and out of the oven by taking hold of the container. In other words, if the housewife pulls forwardly on the container, it may slide into engagement with the members 5, 5, after which the grill and the supporting device will be moved out of the oven without the possibility of pulling the container off the grill.

Having described my invention, I claim:

1. In combination with a grill, a supporting device comprising a substantially rectangular frame having side members lying in the same plane, one end member projecting upwardly beyond the plane of the side members, and the other end member having spaced portions projecting upwardly beyond the plane of the side members, and an intermediate portion extending downwardly below the plane of the side members.

2. In combination with a grill, a supporting device comprising a rectangular wire frame having upwardly extending end members for engaging the grill, and a foot member extending downwardly opposite the upwardly extending members at one end of the frame.

PAULA F. SCHMITT.